US011650150B2

(12) United States Patent
Lin et al.

(10) Patent No.: US 11,650,150 B2
(45) Date of Patent: May 16, 2023

(54) PRISM FOR MEASURING LIQUID CONCENTRATION

(71) Applicant: Taiwan RedEye Biomedical Inc., Hsinchu (TW)

(72) Inventors: Tsung-Jui Lin, Hsinchu (TW); Yu-Hsun Chen, Hsinchu (TW); Shuo-Ting Yan, Hsinchu (TW)

(73) Assignee: Taiwan RedEye Biomedical Inc., Hsinchu (TW)

( * ) Notice: Subject to any disclaimer, the term of this patent is extended or adjusted under 35 U.S.C. 154(b) by 0 days.

(21) Appl. No.: 17/464,854

(22) Filed: Sep. 2, 2021

(65) Prior Publication Data

US 2023/0064160 A1 Mar. 2, 2023

(51) Int. Cl.
*G01N 21/43* (2006.01)
*G02B 5/04* (2006.01)
*G01N 21/05* (2006.01)

(52) U.S. Cl.
CPC ............. *G01N 21/43* (2013.01); *G01N 21/05* (2013.01); *G02B 5/04* (2013.01)

(58) Field of Classification Search
CPC .... G01J 3/0256; G01J 3/42; G01J 3/10; G01J 3/0264; G01J 3/0272; G01N 21/251; G01N 2201/0221; G01N 2021/6439; G01N 21/645; G01N 21/51; G01N 2021/0346
See application file for complete search history.

(56) References Cited

U.S. PATENT DOCUMENTS 4,602,869 A * 7/1986 Harrick ................ G01N 21/552 356/244
2004/0201835 A1* 10/2004 Coates ............... G01N 21/8507 356/73
2005/0007596 A1* 1/2005 Wilks ................ G01N 21/8507 250/353
2020/0348225 A1* 11/2020 Coates .................. G01J 3/0205

FOREIGN PATENT DOCUMENTS

CN 105388127 A 3/2016
TW M504953 U 7/2015

* cited by examiner

*Primary Examiner* — Hwa Andrew Lee
(74) *Attorney, Agent, or Firm* — Karin L. Williams; Alan D. Kamrath; Mayer & Williams PC

(57) ABSTRACT

A prism for measuring liquid concentration includes: an accommodating space for accommodating a liquid; an interface formed on a bottom surface of the accommodating space; a first light transmission surface and a second light transmission surface respectively formed on two side surfaces of the accommodating space; a third light transmission surface and a light emitting surface respectively formed relative to the interface. When a first incident light beam enters the prism, the first incident light beam is reflected to the light emitting surface by the interface, and exits the prism from the light emitting surface. When a second incident light beam enters the prism to the first light transmission surface, the second incident light beam exits the prism to the accommodating space from the second incident light beam, passes through the liquid and the second light to the prism, and exits the prism from the third light transmission surface.

6 Claims, 8 Drawing Sheets

11
16
10
17
100
12
1
15

PRISM FOR MEASURING LIQUID CONCENTRATION

BACKGROUND OF THE INVENTION

1. Field of the Invention

The present invention relates to a prism, in particular to a prism for measuring liquid concentration.

2. Description of the Prior Arts

A solution is a combination of a solute and a solvent. The solvent is used to dissolve the solute, and the solute is diluted in the solvent. The common solvents include water, and the solutes include salt, sugar, pigments, or other chemical substances.

However, after the solute is dissolved in the solvent, a user who wants to measure the concentration of the solution have to use a complex instrument and equipment, which is inconvenient for the user.

Therefore, how to provide a device that can measure the concentration of liquid has become an urgent research topic.

SUMMARY OF THE INVENTION

In view of the above-mentioned problems, the present invention provides a prism for measuring liquid concentration, which comprises:

an accommodating space for accommodating a liquid;

an interface formed on a bottom surface of the accommodating space;

a first light transmission surface formed on a first side surface of the accommodating space;

a second light transmission surface formed on a second side surface of the accommodating space opposite to the first light transmission surface;

a third light transmission surface opposite to the interface; and a light emitting surface corresponding to the interface;

wherein, when a first incident light beam enters the prism, the first incident light beam is transmitted to the interface, the interface reflects the first incident light beam to the light emitting surface, and the first incident light beam exits the prism from the light emitting surface;

wherein, when a second incident light beam enters the prism, the second incident light beam is transmitted to the first light transmission surface and then reflected to the accommodating space; the second incident light beam passes through the liquid in the accommodating space to the second light transmission surface; the second light transmission surface reflects the second incident light beam to the third light transmission surface; and then the second incident light beam exits the prism from the third light transmission surface.

In summary, the prism for measuring the liquid concentration of the present invention can simultaneously or individually detect the refractive index and absorbance of light. Combining light absorption and refraction characteristics, the prism for measuring the liquid concentration can quantitatively analyze the solute in the solution without a condensing element as a light source, thus simplifying the alignment of the optical path. Furthermore, the prism for measuring the liquid concentration of the present invention does not need a lens or an eyepiece, thus reducing the volume of the overall structure. In addition, the prism for measuring the liquid concentration of the present invention does not need a structure such as a filter or a polarizer, thus reducing the production cost.

DETAILED DESCRIPTION OF THE PREFERRED EMBODIMENTS

Figure 1A:
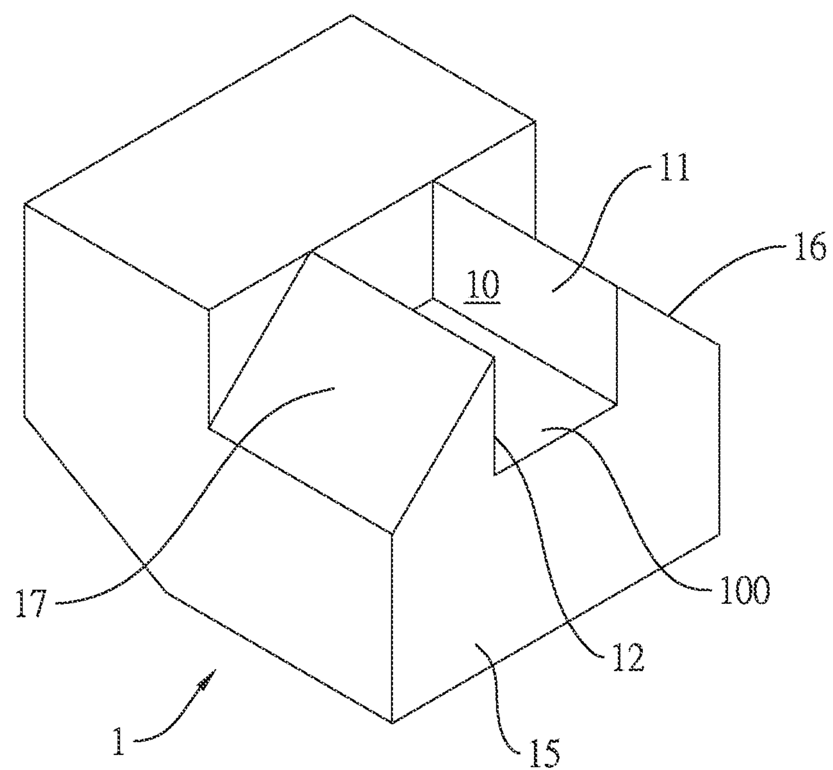
FIGS. 1A and 1B are the first three-dimensional view and the second three-dimensional view of the prism for measuring liquid concentration of the present invention.
Figure 1B:
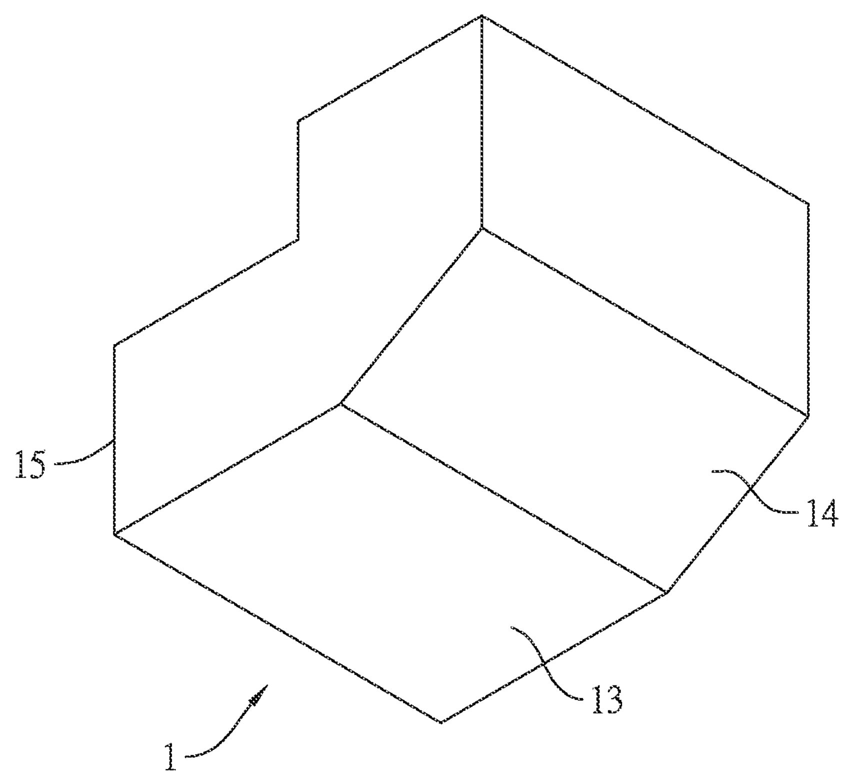

Referring to FIG. 1A and FIG. 1B, the prism for measuring liquid concentration includes an accommodating space 10, a first light transmission surface 11, a second light transmission surface 12, a third light transmission surface 13, and a light emitting surface 14. The accommodating space 10 can accommodate liquid Q. An interface 100 is formed on a bottom surface of the accommodating space 10. The first light transmission surface 11 is formed on a first side surface of the accommodating space 10. The second light transmission surface 12 is formed on a second side surface of the accommodating space 10 opposite to the first light transmission surface 11. The third light transmission surface 13 is disposed facing the interface 100. The light emitting surface 14 is disposed corresponding to the interface 100.

Figure 1C:
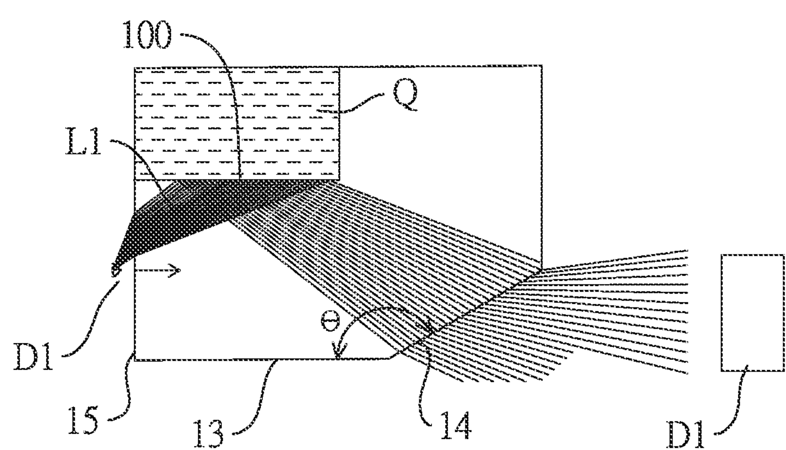
FIGS. 1C and 1D are schematic diagrams of light reflection the prism for measuring liquid concentration of the present invention.

Referring to FIG. 1C, a first incident light beam L1 generated by a first light source S1 enters the prism and is directed to the interface 100. The interface 100 reflects the first incident light L1 to the light emitting surface 14. The first incident light L1 then exits from the light emitting surface 14. Then the first incident light beam L1 can be sensed by a first light sensor D1 disposed outside the light emitting surface 14 to measure the refractive index and the concentration of the liquid Q.

Figure 1D:
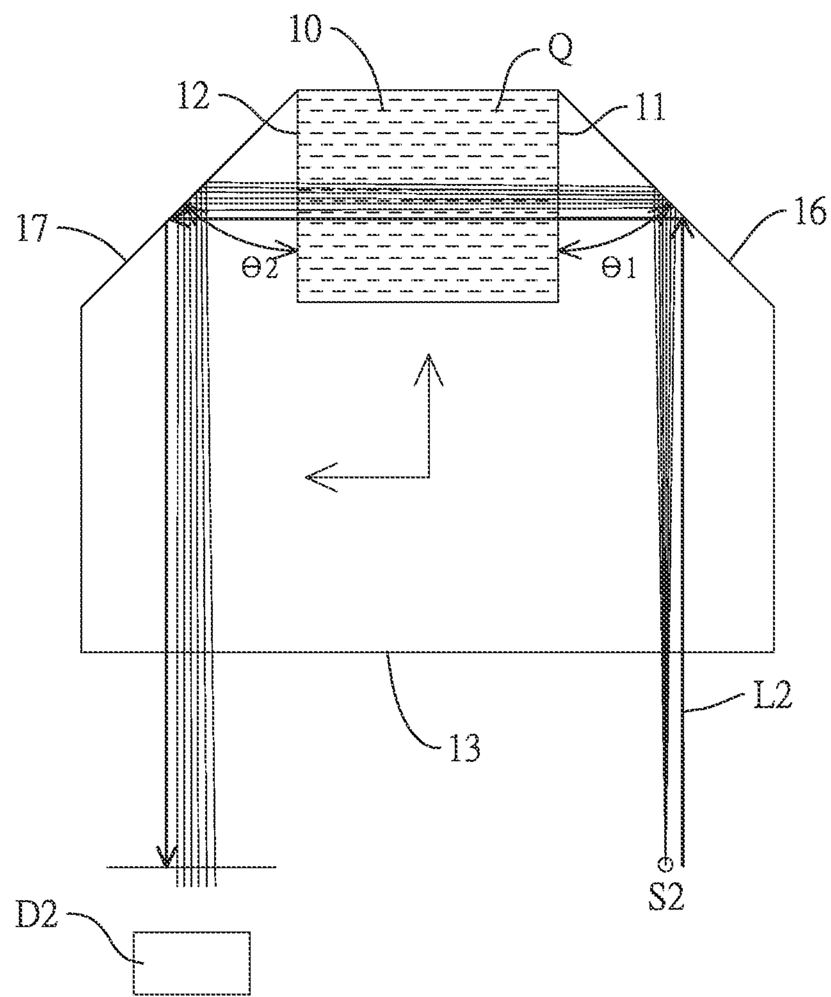

Referring to FIG. 1D, a second incident light beam L2 generated by a second light source S2 enters the prism and is directed to the first light transmission surface 11. The first light transmission surface 11 reflects the second incident light L2 and then the second incident light beam L2 enters the accommodating space 10, passes through the liquid Q in the accommodating space 10, and is directed to the second light transmission surface 12. After the second light transmission surface 12 reflects the second incident light beam L2, the second incident light beam L2 is directed to the third light transmission surface 13. The second incident light beam L2 exits from the third light transmission surface 12 and then is sensed by a second light sensor D2 disposed outside the third light transmission surface 13.

As mentioned above, according to the optical principles, light can be refracted and reflected at the same time when entering different mediums. Therefore, the first light sensor D1 is arranged outside the light emitting surface 14 to measure a light intensity of the first incident light beam L1, and the liquid Q concentration can be calculated according to the light intensity of the first incident light beam L1. In addition, when the light passes through the liquid Q, the liquid Q may absorb the energy of the light to reduce the intensity of the light. Therefore, the second light sensor D2 is arranged outside the third light transmission surface 13 to measure a light intensity of the second incident light beam L2, and then the absorbance of the liquid Q can be calculated by the light intensity of the second incident light beam L2.

Referring to FIGS. 1A and 1C, the prism 1 for measuring liquid concentration further includes a light incidence surface 15 adjacent to the interface 100. In an embodiment of the present invention, the light incidence surface 15 is perpendicular to the connecting interface 100. The first incident light beam L1 of the first light source S1 enters the prism through the light incidence surface 15, and then is directed to the interface 100.

Referring to FIGS. 1B to 1D, the third light transmission surface 13 is adjacent to the light incidence surface 15. In an embodiment of the present invention, the third light transmission surface 13 is perpendicular to the light incidence surface 15. Then the second incident light beam L2 enters the prism through the third light transmission surface 13 and then is directed to the first light transmission surface 11.

Referring to FIGS. 1B and 1C, the light emitting surface 14 and the light incidence surface 15 are respectively adjacent to two opposite sides of the third light transmission surface 13. And there is an angle θ between the light emitting surface 14 and the third light transmission surface 13, and the angle θ is an obtuse angle, which is between 105 degrees and 165 degrees. In a preferred embodiment of the present invention, the angle θ is 135 degrees.

Referring to FIGS. 1A and 1D, the prism 1 further includes a first reflective surface 16 and a second reflective surface 17. When the second incident light beam L2 generated by the second source S2 enters the prism, the second incident light beam L2 is first directed to the first reflective surface 16. The first reflective surface 16 reflects the second incident light beam L2 to the first light transmission surface 11. After the second incident light beam L2 exits the prism 1 from the first light transmission surface 11, the second incident light beam L2 is directed to pass through the liquid Q in the accommodating space 10 and enters the prism through the second light transmission surface 12. The second incident light beam L2 is directed to the second reflective surface 17. Then the second light reflective surface 17 reflects the second incident light beam L2 to the third light transmission surface 13. The second incident light beam L2 exits from the third light transmission surface 13 of the prism 1, and then is sensed by the second light sensor D2 disposed outside the third light transmission surface 13.

The first reflective surface 16 is adjacent to the first light transmission surface 11 and there is a first angle θ1 between the first reflective surface 16 and the first light transmission surface 11. The first angle θ1 is an acute angle between 15 degrees and 75 degrees. In a preferred embodiment of the present invention, the first angle θ1 is preferably 45 degrees. The first reflective surface 16 is configured to be inclined relative to the first light transmission surface 11 at the first included angle θ1 according to an angle at which the second incident light beam L2 enters the third transmission surface 13. The second reflective surface 17 is adjacent to the second light transmission surface 12 and there is a second angle θ2 between the second light reflective surface 17 and the second light transmission surface 12. The second angle θ2 is an acute angle between 15 degrees and 75 degrees. In a preferred embodiment of the present invention, the second angle θ2 is 45 degrees. The second reflective surface 17 is configured to be inclined to the second light transmission surface 12 at the second included angle θ2 according to the angle at which the second incident light beam L2 is reflected from the first reflective surface 16.

Figure 2:
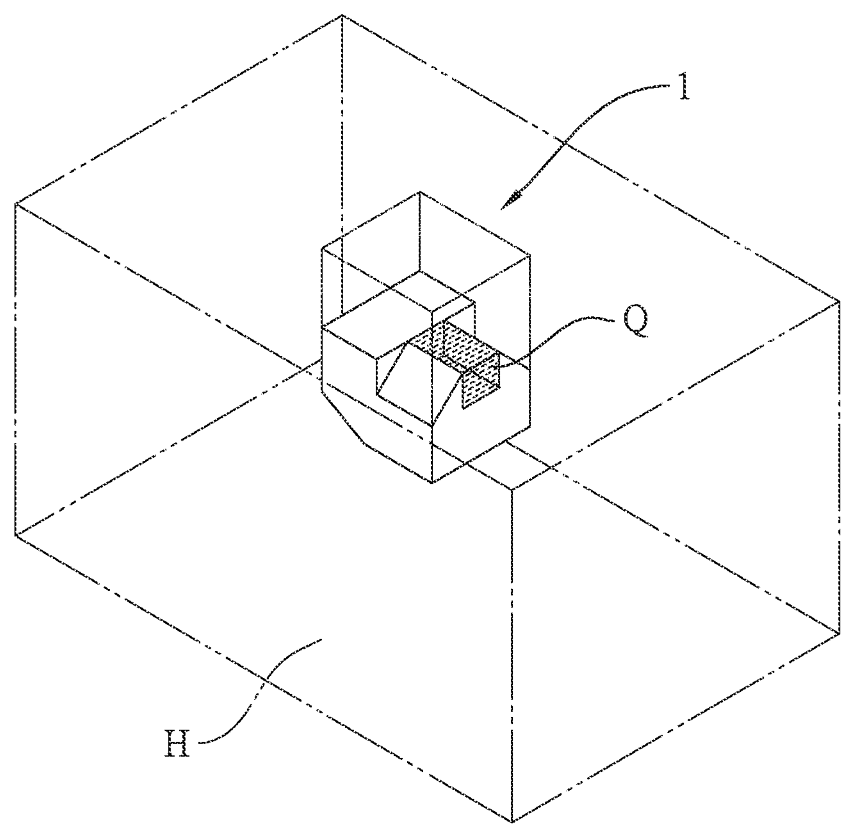
FIG. 2 is a three-dimensional view of the prism for measuring liquid concentration mounted in a housing of the present invention.

Referring to FIG. 2, in an embodiment of the present invention, the first reflective surface 16 and the second reflective surface 17 are respectively one side of two triangular blocks, and the two triangular blocks are respectively arranged on two opposite sides of the accommodating space 10, and form the accommodating space 10 with the interface 100. The prism 1 for measuring liquid concentration further includes a housing H. The prism 1 is disposed in an inner space of the housing H, and the light-incidence surface 15 is attached to an inner surface in the inner space of the housing H, and then the inner space 10 can be enclosed for retaining the liquid Q.

Figure 3A:
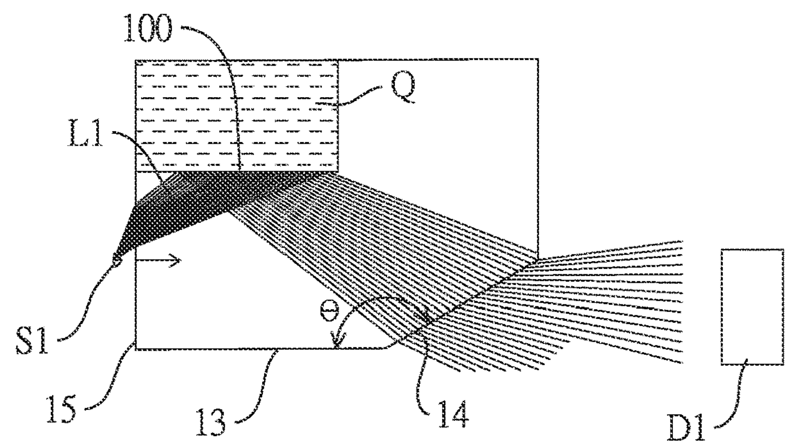
FIGS. 3A to 3C are schematic diagrams of reflected light of the prism for measuring liquid concentration of the present invention.
Figure 3B:
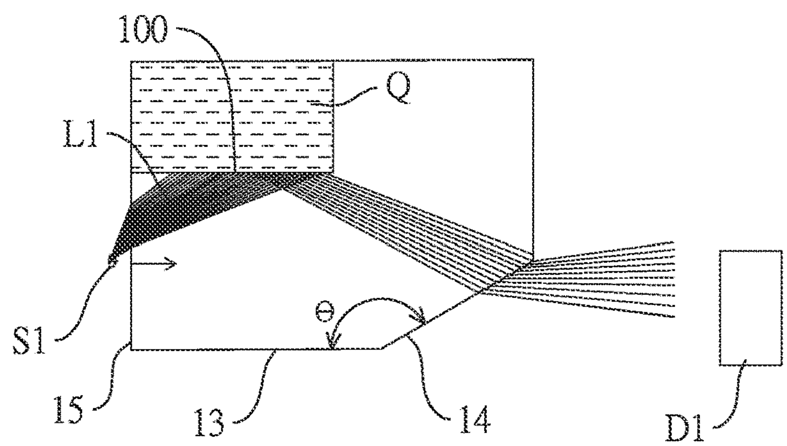
Figure 3C:
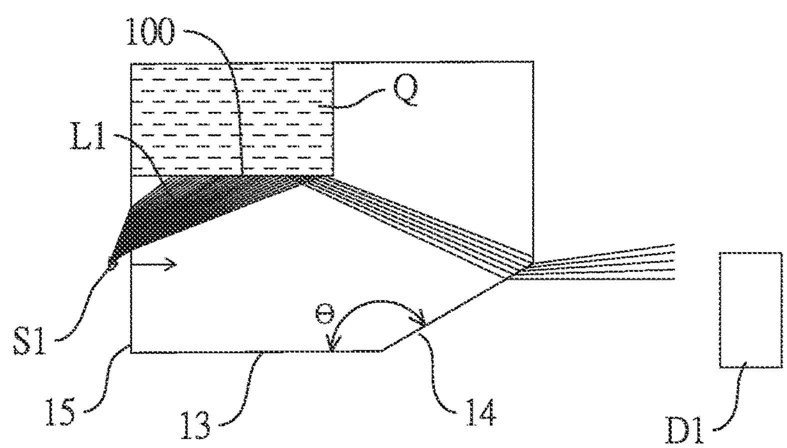

Referring to FIGS. 3A to 3C, the light emitting surface 14 is disposed on the side opposite to the light incidence surface 15, and the first incident light beam L1 is reflected by the interface 100, passes through the light emitting surface 14, and then enters the first light sensor D1. According to optical principles, it is necessary to configure the arrangement angle and area of the light emitting surface 14 to measure the first incident light beam L1 exiting from the light emitting surface 14. Furthermore, under the Snell's Law, the medium refractive index of the prism 1 and the incident angle of the first incident light beam L1 to the interface 100 are known, and then the medium refractive index of the solution Q is calculated according to the reflection angle range of the first incident light beam L1 passing through the interface 100 with different medium refractive indexes (different solutions). The greater the refractive index of the solution Q is, the more light is refracted, i.e. the less light is reflected. Then the less reflected light of the first incident light beam L1 is received by the first light sensor D1 (as shown in FIG. 3B and FIG. 3C). Therefore, it is possible to further define and configure an inclination angle θ and an area of the light emitting surface 14 based on the range of the refractive index of the medium when the incident light beam L1 enters different solutions Q. That is, the inclination angle θ and the area of the light emitting surface 14 are configured according to the reflection angle of the first incident light beam L1 from the interface 100, and the inclination angle θ is the angle between the light emitting surface 14 and the third light transmission surface 13. In addition, the amount of solute in the solution Q can change the density of the solution Q. The different density of solution Q will correspond to different refractive indexes of the light. Therefore, the solute content in the solution Q can be calculated by measuring the refractive index of the light in the solution Q, and then the concentration of the solution Q can be further calculated. In the preferred embodiment, the first light source S1 is arranged on the normal line of the center of the light incidence surface 15 so that the first incident light beam L1 enters the light incidence surface 15 on average. The first light sensor D1 is arranged on a position where the normal line aligning the center of the light emitting surface 14 passes through such that the prism 1 receives the first incident light beam L1 on average.

Referring to FIGS. 4A to 4D, in order to measure the reflected light of the first incident light beam L1 entering the prism 1 and the light of the second incident light beam L2 that has passed through the liquid Q, in an embodiment, the first light source S1 and the second light source S2 may be halogen lamps, gas lamps, lasers, LEDs, or other light emitting elements. Since the light beams generated by the light source S1 are emitted at 360 degrees, the first incident light beam L1 entering the prism can be divided into four parts of light, as shown in FIGS. 4A to 4D.

Figure 4A:
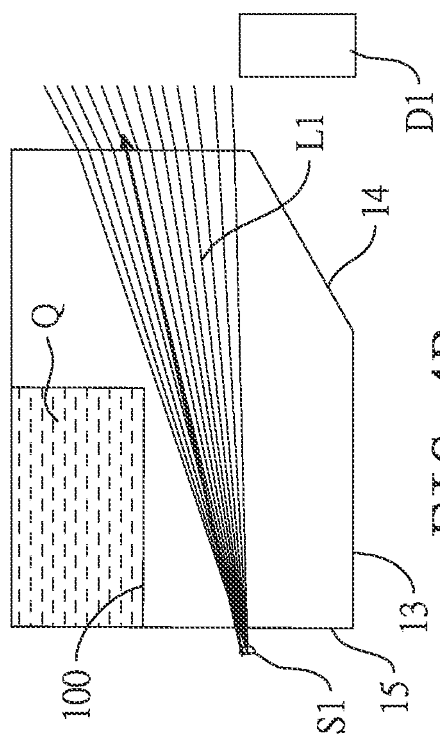
FIGS. 4A to 4D are schematic diagrams of the first incident light beam incident on the prism for measuring liquid concentration of the present invention.
Figure 4B:
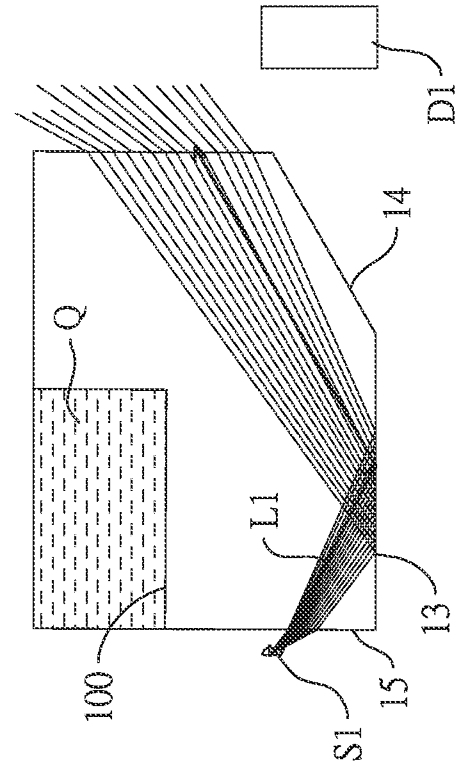
Figure 4C:
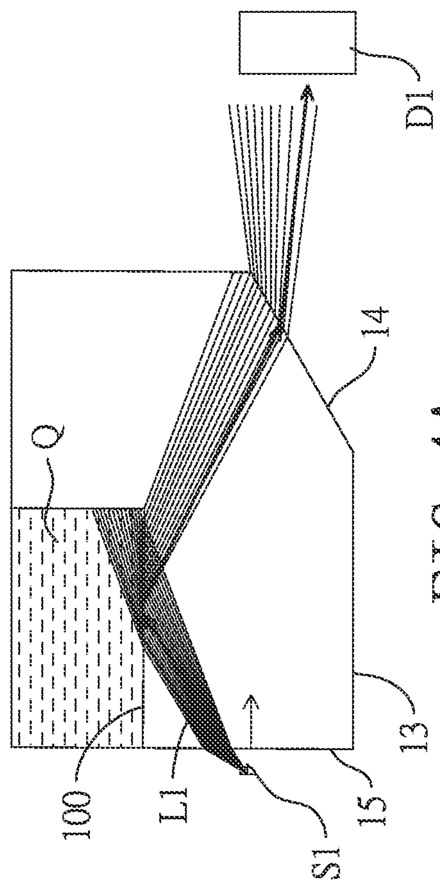
Figure 4D:
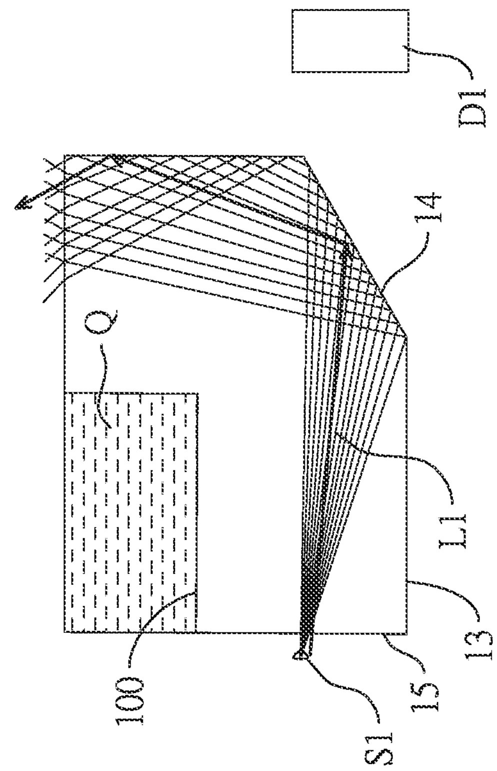

Referring to FIG. 4A, when the first incident light beam L1 enters the interface 100 of the prism 1, the reflected light is emitted from the light emitting surface 14 and is sensed by the first light sensor D1. Referring to FIG. 4B, when the first incident light beam L1 enters the prism 1, since there is no reflective surface or interface 100 along the path that the first incident light beam L1 transmits, the incident light beam is directly emitted out of the prism 1. Referring to FIG. 4C, after the first incident light beam L1 is incident on the light emitting surface 14 of the prism 1, as the incident angle of the first incident light beam L1 is exactly the angle of total reflection formed on the light emitting surface 14, the reflected first incident light beam L1 is directed to other directions and finally exits the prism. Referring to FIG. 4D, the first incident light beam L1 is incident on the third light transmission surface 13 of the prism 1 and is reflected by the third light transmission surface 13, the reflected light does not exit the prism from the light emitting surface 14 but from other directions. Therefore, the first light sensor D1 disposed outside the light emitting surface 14 only receives the reflected light incident on the interface 100 of the prism.

Figure 5:
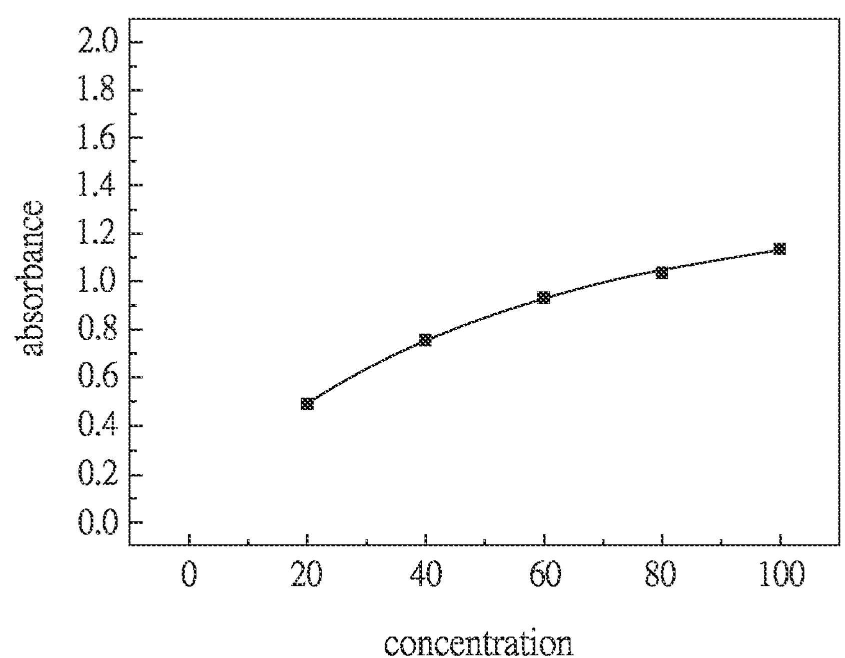
FIG. 5 is a schematic diagram of the relationship between the concentration of the solution and the absorbance of the present invention.

FIG. 5 is a schematic diagram of the relationship between the concentration of the solution of the present invention and the absorbance. The amount of solute in the solution Q may change the absorbance. Therefore, the solute content in the solution Q can be calculated by measuring the absorbance of the solution. Under the Beer-Lambert law, when a parallel light enters the sample perpendicularly, the light-absorbing material of the sample absorbs part of the photon energy, which reduces the intensity of the light. Wherein, the absorbed energy (A) is positively correlated with the sample absorption coefficient ($\alpha$), optical path (sample length) (L), and concentration (c). The formula is as follows:

$$A=\alpha Lc$$

The absorbed energy can be regarded as the absorbance (A). When the light passes through the sample, part of the energy is absorbed and the remaining light penetrates the sample. Therefore, the absorbance of the sample can be calculated from the energy difference between the incident light ($I_0$) and the transmitted light (I). The absorbance is defined as follows:

$$A = -\log\frac{I}{I_0}$$

Furthermore, after the second incident light beam L2 is incident on the first reflective surface 16, it is reflected by the first reflective surface 16 and then transmitted to the solution Q. The solution Q absorbs part of the photon energy to reduce the intensity of the transmitted light, and then the transmitted light is reflected to the second light sensor D2 by the second reflective surface 17. The higher the concentration of the solution Q, the more light energy is absorbed and the weaker the intensity of the transmitted light is. The absorbance can be obtained by the ratio of the intensity of the light source to the transmitted light, and then the concentration of the solution Q can be calculated.

In an embodiment of the present invention, the material of the prism 1 for measuring the liquid concentration includes glass, plastic, or other light-permeable materials. The interface 100, the first light transmission surface 11, the second light transmission surface 12, the third light transmission surface 13, the light emitting surface 14, the light incidence surface 15, the first light reflective surface 16 and the second light reflective surface 17 of the prism may be smooth surfaces, rough surfaces, coated surfaces, shielded surfaces, or other surfaces. The processing method of the prism includes grinding, gluing, molding, injection, or other processing methods.

In an embodiment of the present invention, the first light sensor D1 and the second light sensor D2 include a light detection diode, a light detection diode array, a spectrometer, a CCD sensor, or other photosensitive elements.

In summary, the prism for measuring the liquid concentration of the present invention can simultaneously or individually detect the refractive index and absorbance of light. Combining light absorption and refraction characteristics, the prism for measuring the liquid concentration can quantitatively analyze the solute in the solution without using a condensing element as a light source, thus simplifying the alignment of the optical path. Furthermore, the prism for measuring the liquid concentration of the present invention does not need a lens or an eyepiece, thereby reducing the volume of the overall structure. In addition, the prism for measuring the liquid concentration of the present invention does not need a structure such as a filter or a polarizer, thereby reducing the production cost.

What is claimed is:

1. A prism for measuring liquid concentration comprising:

an accommodating space, for accommodating a liquid;

an interface, formed on a bottom surface of the accommodating space;

a first light transmission surface, formed on a first side surface of the accommodating space, and connected to a first side of the interface;

a second light transmission surface, formed on a second side surface of the accommodating space, and connected to a second side of the interface; wherein the first side of the interface is opposite to the second side of the interface, wherein the second light transmission surface faces the first light transmission surface;

a first reflective surface; wherein two opposite sides of the first light transmission surface are respectively connected between the first side of the interface and a first side of the first reflective surface;

a second reflective surface; wherein two opposite sides of the second light transmission surface are respectively connected between the second side of the interface and a first side of the second reflective surface; wherein the first light transmission surface and the second light transmission surface are located between the first reflective surface and the second reflective surface;

a light incidence surface, connected to a connection side of the interface; wherein two opposite ends of the connection side of the interface are respectively connected to the first side of the interface and the second side of the interface;

a third light transmission surface, wherein two opposite sides of the light incidence surface are respectively connected to the connection side of the interface and a first side of the third light transmission surface; and a light emitting surface, connected to a second side of the third light transmission surface, wherein the first side of the third light transmission surface is opposite to the second side of the third light transmission surface, wherein the interface is mounted between the light incidence surface and the light emitting surface wherein the interface is opposite the light emitting surface, wherein, when a first incident light beam enters the prism, the first incident light beam is transmitted to the interface, the interface reflects the first incident light beam to the light emitting surface, and the first incident light beam exits the prism from the light emitting surface;

wherein, when a second incident light beam enters the prism, the second incident light beam is transmitted to the first light transmission surface and then reflected to the accommodating space; the second incident light beam passes through the liquid in the accommodating space to the second light transmission surface; the second light transmission surface reflects the second incident light beam to the third light transmission surface; and then the second incident light beam exits the prism from the third light transmission surface.

2. The prism for measuring liquid concentration as claimed in claim 1, wherein the light incidence surface is perpendicular to the interface.

3. The prism for measuring liquid concentration as claimed in claim 1, wherein the third light transmission surface is perpendicular to the light incidence surface.

4. The prism for measuring liquid concentration as claimed in claim 1, wherein there is an angle between the light emitting surface and the third light transmission surface in a range between 105 degrees and 165 degrees.

5. The prism for measuring liquid concentration as claimed in claim 1, wherein, there is a first angle between the first reflective surface and the first light transmission surface in a range between 15 degrees and 75 degrees.

6. The prism for measuring liquid concentration as claimed in claim 1, wherein, there is a second angle between the second reflective surface and the second light transmission surface in a range between 15 degrees and 75 degrees.

* * * * *